Nov. 16, 1971  D. L. BLACHLY ET AL  3,620,055

PORTABLE STEAMER

Filed May 20, 1970  2 Sheets-Sheet 1

Inventors
Donald L. Blachly
Richard A. Smith
By: Neil M. Rose
Atty.

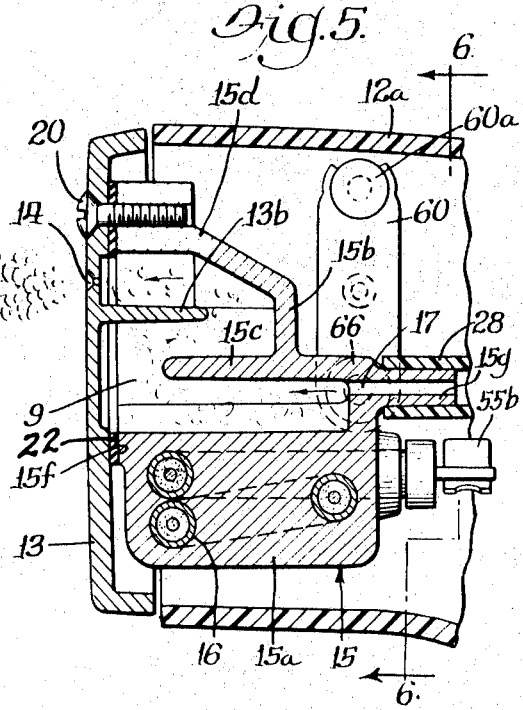
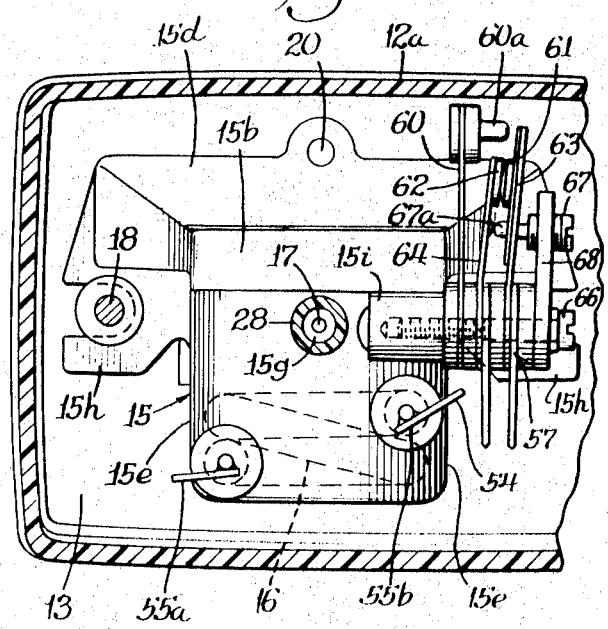
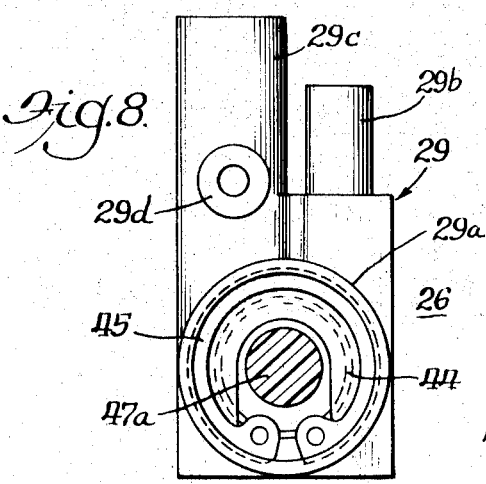
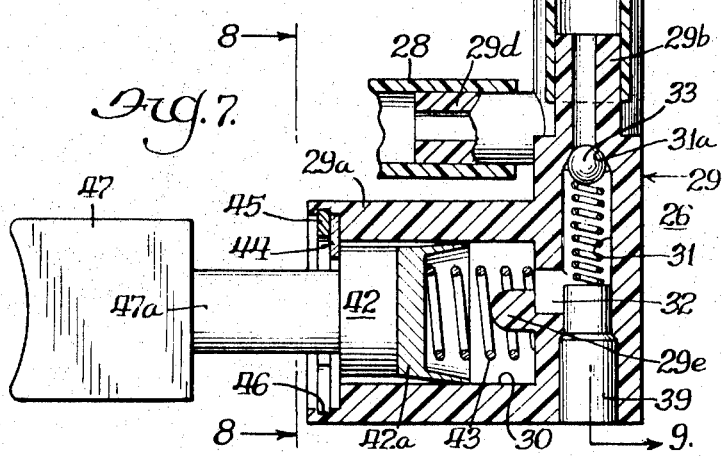

United States Patent Office 3,620,055
Patented Nov. 16, 1971

3,620,055
PORTABLE STEAMER
Donald L. Blachly, Glendale, and Richard A. Smith, Milwaukee, Wis., assignors to John Oster Manufacturing Co., Milwaukee, Wis.
Filed May 20, 1970, Ser. No. 38,972
Int. Cl. A47j 51/00; D06c 1/00
U.S. Cl. 68—222
13 Claims

ABSTRACT OF THE DISCLOSURE

A portable, hand-held steamer comprising a casing with a head portion and a depending handle. A metal plate forms a front closure wall of the casing head portion and is provided with steam discharge ports therein for directing a flow of steam onto a garment. A flash type steam generating chamber is mounted in the head portion of the casing for converting water to steam and directing the steam out through steam discharge ports. Thermostatically controlled electric heating means is provided for maintaining wall surfaces of the steam generating chamber at a temperature sufficient to flash water striking the same into steam. A refillable water reservoir is provided in the head portion, and liquid pump means is in fluid communication therewith. Conduit means is provided for delivering liquid to the flash chamber, and the pump includes an actuator projecting outwardly of the handle for hand manipulation to pump water from the reservoir into the steam generating chamber.

---

The present invention relates to a new and improved, portable, hand-held steamer of the type used for the removal of wrinkles in hanging garments and the like by the application of steam thereto.

In recent years, portable steamers for removing wrinkles from hanging garments have become especially popular with travelers. Many such steamers are subject to difficulties, however, such as the discharge or dripping of water onto the garments when the steamer is not maintained in a substantially upright position. Also some of these steamers are cumbersome and unhandy to use and do not have satisfactory means for controlling the amount of steam discharged against the garment with which the device is used. Moreover, other problems of prior art steams include overheating during use and the like.

It is an object of the present invention to provide a new and improved portable hand steamer which eliminates all or many of the foregoing problems and difficulties of prior art devices.

Another object of the present invention is to provide a new and improved portable hand-held steamer which does not leak water regardless of the position in which it is held.

A further object of the present invention is the provision of a new and improved portable steamer capable of continuous use over a prolonged period without overheating.

Still another object of the present invention resides in providing a new and improved portable steam which is easy to control and manipulate and which conserves water so that all of the water is flashed into steam without loss and with accurate control thereof.

A still further object of the present invention is to provide a new and improved hand-held steamer which is neat in appearance, easy to handle and manipulate, relatively low in cost, and one which lends itself readily to manufacture on a mass production basis.

The foregoing and other objects and advantages of the present invention are accomplished in one illustrated embodiment thereof comprising a portable, hand-held steamer having a housing formed with a head portion and a depending handle. A sole plate is provided to form a front closure for the head portion of the housing. The sole plate is formed with a plurality of spaced steam discharge ports therein for directing steam flow outwardly against a garment. A flash type steam chamber is mounted in the head portion of the housing in direct communication with the steam discharge ports in the sole plate, and an electric heater means is provided for heating a steam generating surface in the steam chamber to flash water introduced therein and against said surface into steam. A refillable water reservoir is mounted in the head portion of the housing and liquid pump in fluid communication with the reservoir is provided for delivering liquid at a controlled flow rate to the flash chamber. The pump means includes a manual actuator projecting outwardly of the handle so that the pump may be actuated by the finger as the steamer is moved over the garment.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings, in which:

FIG. 5 is an enlarged fragmentary sectional view taken substantially along line 5—5 of FIG. 2, again assuming FIG. 2 shows the complete structure;

FIG. 6 is an enlarged, fragmentary, transverse, sectional view taken substantially along line 6—6 of FIG. 5 also assuming that FIG. 5 shows the complete structure;

FIG. 7 is an enlarged, vertical view (with portions shown in section) of the liquid pump for the steamer constructed in accordance with the features of the present invention;

FIG. 8 is a view of the liquid pump looking in the direction of the arrows 8—8 in FIG. 7 and assuming FIG. 7 shows the complete structure; and FIG. 9 is a sectional view of the pump taken substantially along line 9—9 of FIG. 7, again assuming that FIG. 7 shows the complete structure.

Referring now more particularly to the drawings, therein is illustrated a new and improved, portable, hand-held garment steamer 10 which is especially adapted for removing wrinkles from a hanging garment 11 without requiring the use of an ironing board or other pressing surface. The portable steamer 10 is adapted to be held and manipulated in one hand and moved over the surface of the garment to remove the wrinkles therein without requiring direct pressing contact between a sole plate of the steamer and the surface of the garment.

Figure 3:
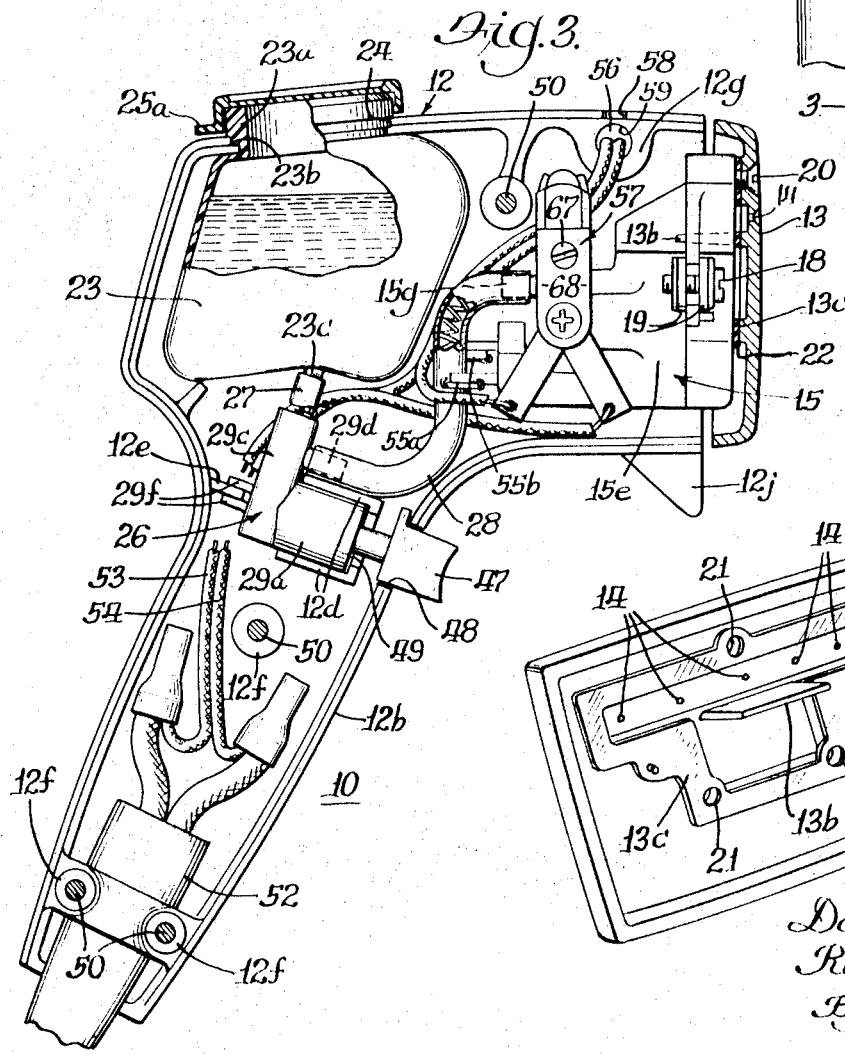
FIG. 3 is a sectional view taken substantially along line 3—3 of FIG. 2 and assuming that FIG. 2 shows the complete structure.

In accordance with the present invention, the steamer 10 includes a casing or housing 12 preferably formed of two mating halves each constructed of a suitable molded plastic material which should be electrically insulating and heat resistant as well as being extremely strong and light in weight. The casing 12 includes an enlarged, generally rectangular, upper head portion 12a and an elongated hollow handle portion 12b depending downwardly and angularly rearwardly of the head portion 12a. The head portion is open at the forward end, as best shown in FIGS. 3 and 5 of the drawings. This open end is effectively closed by a sole plate 13 which has a projecting peripheral lip 13a around the edges thereof which tends to mate, but is spaced slightly from the edges defining the open end of head portion 12a of casing 12.

Figure 2:
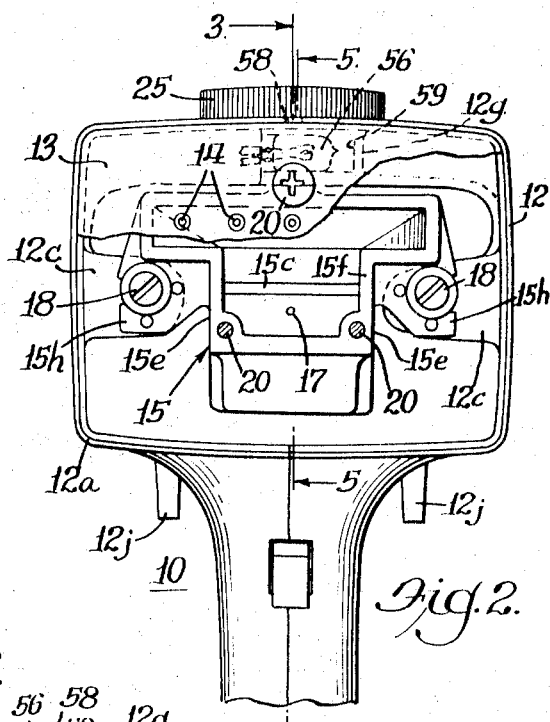
FIG. 2 is a front elevational view of the upper portion of the steamer with portions broken away to show internal details therein viewed from the sole plate end thereof.
Figure 4:
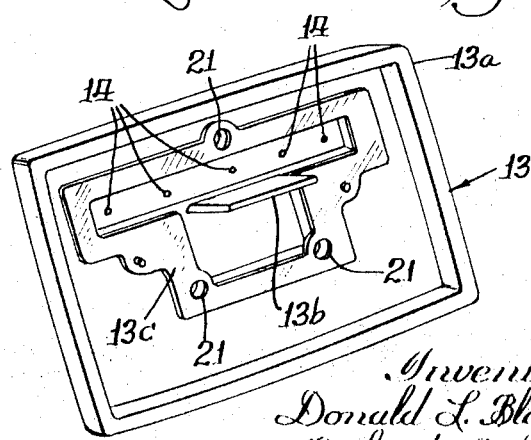
FIG. 4 is a perspective rear view of the sole plate of the steamer shown in FIGS. 2 and 3 of the drawings.

In order to perform its function the sole plate 13 is formed of metal, such as cast aluminum or the like, and is provided with a plurality of spaced apart apertures or steam discharge ports 14 arranged in a predetermined manner as best shown in FIGS. 2 and 4 of the drawings. These ports 14 direct steam jets outwardly against a garment, as illustrated in FIG. 5 of the drawings. Beneath the steam ports 14, and on the rear side thereof, the sole plate 13 is provided with a rearwardly extending, integrally formed plate or baffle 13b, the purpose of which will be discussed more fully hereinafter.

For the purpose of producing steam for discharge through the ports 14 there is provided a steam generating means or housing 15 suitably supported (as described hereinafter) within the head portion 12a of casing 12 adjacent the open end of head portion 12a. This steam generating means 15 together with the sole plate 13 defines a steam generating chamber 9 therein adapted to receive water and substantially instantaneously flash it into steam for discharge through the steam ports 14 in the sole plate 13. As illustrated the steam generating means 15 comprises means in the form of a housing preferably constructed of a material which is a good heat conductor. In a device built in accordance with the present invention, means 15 was formed as a die casting of an aluminum alloy comprising (FIG. 5) an integral structure having a bottom wall 15a, a rear wall 15b, a forwardly extending divider wall 15c projecting into steam generating chamber 9, a top wall 15d and side walls 15e. The forward portion of housing 15 terminates in a somewhat T-shaped opening surrounded or defined by a planar surface 15f best shown in FIG. 2 of the drawings.

A steam generating means requires heat, and to this end there is provided an electric heating element 16 in the form of a conventional sheathed heating unit arranged in the form of a coil (FIGS. 5 and 6) cast into the bottom wall 15a which is relatively thick to accommodate the heating element 16. The embedded heating element 16 is capable of heating the walls of housing 15 to such an extent that water entering steam generating chamber 9 is substantially instantaneously flashed into steam.

To supply water to steam generating chamber 9, there is provided in the rear wall 15b just above the bottom wall 15a a water inlet passage 17. So that connections with an external source of water can readily be made with inlet passage 17, the housing 15 includes an integral nipple portion 15g (FIG. 5) projecting from the rear wall 15b and defining therein a rearward extension of the inlet passage 17.

For the purpose of supporting the steam generating means 15 within the casing 12, the former is provided with integral ears 15h projecting from the sides (FIGS. 2, 3 and 6 of the drawings), which are adapted to engage support lugs 12c projecting inwardly from the walls defining casing 12 and molded integrally therewith. The support lugs 12c are provided with tapped openings to receive bolts or fastening means 18 which extend through openings or slots in ears 15h. To reduce the conductive heat transfer from steam generating means 15 to casing 12 insulating washers (FIG. 3) are preferably interposed between support lugs 12c and ears 15h. The ears 15h may be sandwiched between heat insulating washers 19 before being clamped to lugs 12c by bolts or fastening means 18.

In order to complete the steam generating chamber 9, the sole plate 13 is provided on its rear with an integral planar flange 13c (FIGS. 3 and 4) conforming substantially to the planar surface 15f surrounding the T-shaped opening in housing 15. The sole plate is secured to the front open end of housing 15 by suitable fastening means such as screws 20 which extend through openings 21 in sole plate 13 and engage tapped openings defined in casting 15. A suitable sealing gasket 22 (FIGS. 3 and 5), having the configuration of flange 13c and capable of withstanding high temperatures is sealingly clamped between the mating planar surfaces 13c and 15f of the sole plate 13 and casting 15 respectively. Thus the steam generating chamber 9 is a sealed chamber having the inlet port 17 and the discharge ports 14, the former as illustrated best in FIGS. 2 and 5 of the drawings being adjacent the bottom of the steam generating chamber 9 while the ports 14 are disposed in a line adjacent the top of this chamber as viewed in these figures.

In accordance with another important feature of the present invention, the rearwardly facing edge of the peripheral rim or lip 13a of the sole plate 13 is disposed in spaced apart relation from the forward or open end of the head portion 12a of the steamer casing 12 in order to reduce conductive heat transfer between the sole plate and the casing. Thus by virtue of the mounting means for casting 15 and the spacing of the sole plate 13 from casing 12, conductive heat transfer between the sole plate 13 and steam generating means 15 on the one hand and the casing 12 on the other hand is greatly reduced so that the temperature of the casing 12 is maintained at a level which is not uncomfortable to the operator, even after long periods of usage.

From the above description of the steam generating chamber 9, and particularly with reference to FIG. 5 of the drawings, it will be apparent that the design is such as to require a tortuous path for water and steam from the inlet passage 17 to the steam discharge ports 14. Water entering at inlet 17 strikes the hot bottom wall 15a of steam generating chamber 9 containing the embedded heating element 16 and is quickly converted to steam. By virtue of the divider wall 15c which extends across the full width of the steam generating chamber (see FIG. 2), the steam produced must move to the left, as viewed in FIG. 5, before it can move upwardly and hence is maintained in intimate contact with the hot bottom wall to insure a dry steam. By virtue of the baffle 13b spaced above divider wall 15c the steam must then reverse its direction in its movement toward discharge ports 14 first to the right and then to the left thereby ensuring intimate contact with the hot walls of the steam generating chamber 9 and ensuring the discharge of dry steam from steam discharge ports 14.

So that a supply of water is available for feeding the same to the steam generating chamber 9 through water inlet 17, there is also supported in the head portion 12a of the casing 12 a water reservoir 23. This reservoir 23 is disposed completely above and outside the hollow handle portion 12b, and at the opposite end of head portion 12a from the end adjacent sole plate 13. Water reservoir 23, preferably molded from a suitable plastic includes an upstanding circular filler neck 23a which projects upwardly through a circular opening 24 formed in the top wall of the head portion 12a of the casing 12. As best shown in FIG. 3 of the drawings the filler neck 23a is used to secure and support reservoir 23 within casing 12. To this end the filler neck 23a is provided with an external annular recess 23b to receive therein the edges of casing 12 defining circular opening 24. The insertion of this circular edge into recess 23b can readily be accomplished when the two casing halves of casing 12 are assembled. Thus reservoir 23 is effectively suspended by its filler neck 23a. By virtue of the projection of filler neck 23a of reservoir 23 outside of casing 12 one may readily fill or add water to the reservoir from time to time.

In order to prevent the spillage of the water from the reservoir 23, a removable snap-on type cap 25 having a lift-tab 25a is provided normally to close the reservoir except during the filling operation. So that water may be withdrawn from reservoir 23 and supplied to steam generating chamber 9 the former is provided with an integrally formed downwardly projecting short discharge sleeve or nipple 23c (FIG. 3).

For the purpose of selectively supplying water from reservoir 23 to the steam generating chamber 9, there is provided a water pump 26 having its inlet connected to reservoir 23 by a conduit or flexible plastic tube 27 and its outlet connected to the nipple 15g of the steam generating means 15 by means of a conduit or flexible plastic tube 28 (FIGS. 3 and 7). The pump 26 is illustrated as of the manually actuated piston type mounted below reservoir 23 within the handle portion 12b of the casing 12 whereby it may readily be operated by the finger of the person holding the steamer 10 by the handle portion 12b in the manner shown in FIG. 1 of the drawings.

The pump 26 is illustrated as a simple self-contained device comprising a one piece pump body or housing 29, preferably molded from a suitable plastic, and defining therein all the necessary pump elements. As illustrated the pump body 29 includes a portion 29a defining a pump cylinder 30 therein. The pump body 29 also includes in addition to portion 29a integral portions 29b and 29c defining respectively the inlet check valve housing, and the outlet check valve housing respectively. As best shown in FIG. 9 of the drawings the portion 29b defines a pump inlet passageway 31 therein connected through a port 32 (FIGS. 7 and 9) with one end of cylinder 30. A ball type pump inlet check valve 33 is mounted in inlet passageway 31 and forced into seating engagement with valve seat 31a by means of check valve spring 34. Similarly the portion 29c of pump body 29 defines a pump outlet passageway 35 therein connected through a port 36 (FIG. 9) with the same end of cylinder 30 to which inlet passageway 31 is connected. A ball type pump outlet check valve 37 is mounted in passageway 35 and forced into seating engagement with valve seat 35a by means of check valve spring 38. Check valve seats 31a and 35a may be formed during the molding operation or machined after molding through open ends of passageways 31 and 35, respectively, which are subsequently closed by plugs 39 and 40, after the check valves are assembled. These plugs may be cemented in place. It will be understood that the plug 39 engages the end of compression spring 34 remote from ball 33 and biases the latter into sealing engagement with valve seat 31a. Similarly, the plug 40 engages the end of compression spring 38 remote from ball 37 and biases the latter into sealing engagement with valve seat 35a. To define a pump outlet passageway after plug 40 is in place, pump body portion 29c is provided with a lateral integral tubular projection 29d (FIGS. 3, 7 and 8) connected to outlet passageway 35 above the outlet check valve as viewed in FIG. 9 of the drawings.

In order to connect the inlet of pump 26 with the water reservoir 23 the flexible plastic tube 27 is illustrated (FIG. 9) as having one end slipped over nipple 23c and the other slipped over the open end of pump body portion 29b and secured in water tight relationship by any suitable means, not shown. Similarly the flexible plastic tube 28 has one end slipped over nipple 15g of steam generating means 15 (FIG. 5) and the other end slipped over pump outlet sleeve 29d (FIG. 7) and secured in water tight relationship by suitable means.

Considering now the pump cylinder 30 (FIGS. 7 and 8) there is reciprocatingly mounted therein a piston 42 having a cup-shaped pump seal 42a at the inner end thereof. The piston is biased outwardly by a coiled compression spring 43 interposed between the inner end of the cylinder 30 and the adjacent end of piston 42. In order to limit the inward travel of the piston, a stop 29e is provided (FIG. 7) molded integrally with pump housing 29. To limit maximum outward movement of piston 30 under the bias of compression spring 43 a stop washer 44 is provided which is retained in place adjacent the outer end of the cylinder by a snap ring 45 seated in a cooperating annular groove 46 defined in cylinder 30.

In view of the detailed description given of pump 26 the operation thereof will readily be understood. When the reservoir 23 is filled with water this water will flow down to pump 26 until stopped by check valve 33. When piston 42 is moved toward the closed end of cylinder 30 whatever is contained in cylinder 30 is forced out through the pump outlet through check valve 38. Upon actuation of the piston 42 in the opposite direction under the bias of spring 43, a vacuum is created in cylinder 30 sucking in a charge of water through port 32 past inlet check valve 33. Thereafter when the piston 42 is forced inwardly compressing the spring 43, the water in cylinder 30 is forced out through a port 36 and into outlet passageway 35 and past the check valve 37 to outlet sleeve 29d. Thus, reciprocation of the piston 42 provides a positive displacement of water from the reservoir 23 into the steam generating chamber 9, and the rate of reciprocation of the piston regulates the flow rate of water to be flashed into steam.

So as to move the piston 42 inwardly on a pressure or working stroke, a manual actuator 47 (FIGS. 2, 3 and 7) is provided connected to piston 42 by a suitable connecting member 47a. The push button 47 is arranged to project out through an opening 48 provided in the handle portion 12b of casing 12 adjacent where a user's fingers would be in grasping handle portion 12b. With this arrangement the operator can actuate pump 26 by one finger while manipulating the steamer 10.

For the purpose of suitably supporting pump 26 within the hollow handle portion 12b of casing 12 the casing is provided with integral inwardly directed rib portions 12d in each casing section defining a recess or pocket 49 (FIG. 3) for receiving therein and securing in position the housing portion 29a. Additionally pump housing 29 is provided with a pair of spaced integral lugs 29f for receiving therebetween a projecting rib 12e integral with and disposed within handle portion 12b of casing 12.

It will thus be seen that the steamer 10 may be conveniently held in one hand and moved about the surface of the garment 11 while the push button 47 is actuated by the finger to supply water to the steam generating chamber 9. The water is almost instantaneously flashed into steam as it flows over the very hot walls of steam generating means 15 and through the tortuous path provided in steam generating chamber 9 before it can exit through the discharge ports 14.

Because the reservoir 23 is positively sealed by the cap 25 and the pump 26 includes both inlet and outlet check valves, water cannot leak or pass into the steam generating chamber 9 unless the pump 26 is actuated. The amount of water pumped is readily controlled and, consequently, the amount of steam produced is adjusted as desired by the rate of pumping action.

As best shown in FIGS. 2 and 3 of the drawings and as previously mentioned, the casing 12 is preferably constructed of two mating half sections which are joined together along the vertical center line of the steamer 10. The two casing sections are fastened together after the interior components have been assembled into position as described. The halves of the housing are secured together in assembled relation by a plurality of fasteners, such as screws 50 (FIG. 3) extending transversely through suitable threaded bosses 12f formed integral with the casing sections and within the same. Preferably the peripheral edges of the casing sections of casing 12 are formed with mating flanges and recesses in order to provide a key connection of the two sections of the housing into an effectively integral unit when the steamer 10 is fully assembled.

Figure 1:
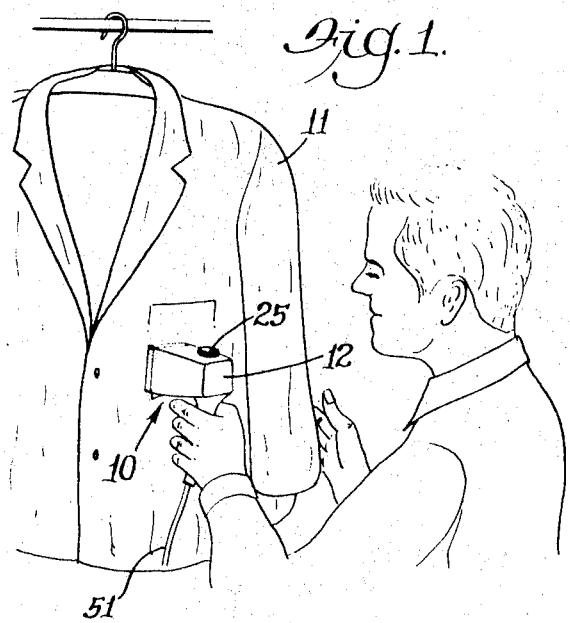
FIG. 1 is a perspective view illustrating the use of a portable hand-held steamer in accordance with the present invention for removing wrinkles from a hanging garment.

For the purpose of energizing the embedded sheathed heating element 16 associated with the steam generating means 15, a suitable power cord 51 is provided entering casing 12 at the end of handle portion 12b remote from upper head portion 12a (FIGS. 1 and 3). The power cord 51 includes a pair of insulated conductors having secured thereto a conventional strain relief 52 disposing within casing 12 and clamped between adjacent casing sections when the lower screws 50 secure the casing sections together. The power cord 51 is connected to a pair of leads 53 and 54. The lead 53, is connected to one terminal lug 55a of electric heating means 16 while the lead 54 is connected to the other terminal lug 55b through the thermostatically controlled switch means 57. A pilot light bulb 56 is connected in parallel with the heating element 16 so when the latter is energized the pilot light is lit. With this arrangement the pilot light is energized when power is connected to power cord 51 and the switch 57 is closed. The water pump should not be actuated until the pilot light becomes deenergized due to the opening of the thermostatically controlled switch 57.

So that the pilot light 56 is fully protected but readily visible to the operator, it is seated in a pocket 59 defined in casing 12 by projecting wall portions 12g integral with the sections of casing 12, and is adapted to be visible through an opening 58 (FIG. 3) formed in the top wall of the head portion 12a of the casing 12 thereby to indicate when the heating element is energized.

The thermostatically controlled switch means 57 (FIGS. 3 and 6) comprises an assembly including a bimetallic element 60, switch contact members 61 and 62 mounted on contact supporting arms 63 and 64, respectively, and an insulating member 60a mounted on the free end of bimetallic element 60 to engage and move contact supporting arm 63 and hence movable switch contact member 61 out of engagement with stationary switch contact member 62. As illustrated one end of the bimetallic element 60 and one end of each of the switch supporting arms 63 and 64 are secured together in spaced insulated relationship in a suitable well known assembly comprising the thermostatically controlled switch means 57 and this assembly is secured by fastening means 66 to a heat lug 15i on steam generating means 15 with the bimetallic element 60 in good heat exchange relationship with said steam generating means. Thus the thermostatically controlled switch means 57 is directly responsive to the temperature of the steam generating means and when the latter is sufficiently hot the circuit is interrupted at switch contact members 61 and 62.

To permit calibration of the temperature of the steam generating means 15 at which the thermostatically controlled switch means 57 interrupts the circuit to heating element 16 there is provided a calibration screw 67 (FIGS. 3 and 6) suitably mounted in rigid support 68 included in the thermostatically controlled switch means 57. The screw 67 is provided with an insulating projection 67a engageable with the contact supporting arm 64, supporting stationary switch contact member 62. With this arrangement the position of stationary switch contact member 62 may be adjusted at the factory to the desired setting. It will be understood that contact supporting arms 63 and 64 are formed of resilient conducting material so as to be each normally biased toward a switch closing position.

From the foregoing description it will be seen that the new and improved, hand-held, portable steamer 10 of the present invention provides a handy device for use in steaming the wrinkles from a hanging garment 11 without requiring an ironing board or other pressing surface. In order that the device may be placed down momentarily on a suitable support without danger of contact between the sole plate 13 and the surface on which the device is laid, the casing 12 is provided with a pair of projecting feet 12j (FIGS. 2 and 3) formed on the underside of the head portion 12a thereof. The device may be easily held and manipulated in one hand and the amount of steam supplied is readily and easily controlled by the operator's finger. Manipulation of the manual operator button pump actuating knob 47 activates the liquid pump 26 which controls the amount of liquid introduced into the steam generating chamber 9 and consequently the amount of steam produced. The unique design of the steam generating means eliminates the discharge of drops of water but instead ensures the discharge of dry steam from steam discharge ports 14. The steamer 10 can be manufactured on a mass production basis at relatively low cost, is extremely reliable in operation, neat in appearance, small in size, and light in weight. It is a particularly useful appliance for the traveler who has limited luggage space available.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A portable, lightweight, hand-held steamer comprising a casing having an upper head portion and a depending handle portion, a pressing plate forming an exterior wall of said head portion and provided with a plurality of spaced steam ports therein for directing steam flow outwardly against a garment, a flash type steam generating chamber in said head portion having an open end closed by said pressing plate and in communication with said ports for receiving water and flashing said water into steam for discharge through said ports, electric heater means in intimate heat transfer relation with a wall surface of said steam generating chamber remote from said pressing plate, a water reservoir in said head portion of said casing, pump means within said handle portion below said reservoir in fluid communication with said reservoir for transferring controlled amounts of liquid to said steam generating chamber, the water transferred by said pump means being discharged onto said wall surface of said steam generating chamber, said pump means including manually actuated means extending externally of said handle portion of said casing below said head portion for hand manipulation of said pump means while supporting said steamer with said hand.

2. The steamer of claim 1 wherein said steam generating chamber includes a casting having means defining an opening, said sole plate forming a closure for said opening.

3. The steamer of claim 2 including heat insulating sealing means disposed between said casting and said sole plate to reduce the heat transfer therebetween.

4. The steamer of claim 2 wherein said sole plate is mounted in peripherally spaced apart relation with respect to the said head portion of said casing for reducing heat transfer to said casing by conduction.

5. The steamer of claim 1 wherein said steam generating chamber is defined by a casting of good heat conducting means and said sole plate, said electric heater means being in direct conductive heat transfer relation with one wall of said casting, inlet means defined in said casting for receiving water from said pump means to be flashed into steam, said inlet means being remote from said steam ports.

6. The steamer of claim 5 including first partition means in said chamber integral with said casting projecting forwardly of a rear wall of said casting and terminating in a forward edge spaced rearwardly of said sole plate, said sole plate including baffle means projecting rearwardly thereof below said nozzle openings and above said first partition means, said first partition means and said baffle means defining a tortuous passageway for said steam from said inlet means to said steam ports to insure the discharge of dry steam.

7. The steamer of claim 2 including thermostat means adjacent said casting for controlling said electric heater means to maintain a surface temperature of said casting at a predetermined temperature above the boiling point of water.

8. In a portable, hand-held steamer comprising a casing having an upper head portion and a depending handle portion, a pressing plate forming a front wall for effectively closing an open end of the head portion of said casing, means defining a plurality of steam ports in said pressing plate for directing steam onto a garment, a housing in said head portion defining a steam generating chamber having a heated wall surface for converting water into steam and directing steam toward said steam ports, said pressing plate associated with said housing to partially define said steam generating chamber, thermostatically controlled electric heater means for maintaining said wall surface of said housing at a temperature to flash water striking the same into steam, water reservoir means in said head portion, pump means within said handle portion in fluid communication with said reservoir, onto said wall surface of said steam generating chamber, said pump means including manually actuatable means outwardly of said handle portion below said head portion for finger manipulation to pump water from said reservoir to said chamber.

9. The steamer of claim 8 wherein said pump means includes a cylinder and a piston slidable therein and connected to said manually actuatable means, a first check valve between said reservoir and said cylinder and a second check valve between said cylinder and steam generating chamber.

10. The steamer of claim 9 wherein said pump means includes a body defining said cylinder and a pair of parallel passages in communication with said cylinder, said first and second check valves being mounted in said respective passages.

11. The steamer of claim 8 wherein said pump means includes a body defining a cylinder and passages in communication with said cylinder, and wherein said passages are formed with annular valve seats therein and ball members are spring biased toward said seats.

12. The steamer of claim 8 wherein said casting defining said steam generating chamber has an open end closed by said sole plate.

13. The steamer of claim 5 including means formed in part by said sole plate and in part by said casting defining a tortuous path for said steam between said inlet and said steam ports.

References Cited
UNITED STATES PATENTS

| | | | |
|---|---|---|---|
| 2,483,579 | 10/1949 | Green | 38—77.83 |
| 2,700,236 | 1/1955 | Marvin et al. | 38—77.83 |
| 3,272,964 | 9/1966 | Carlos et al. | 68—222 |
| 3,372,499 | 3/1968 | Gilbert | 38—77.83 |

PATRICK D. LAWSON, Primary Examiner

U.S. Cl. X.R.

38—71

PO-1050
(5/69)

UNITED STATES PATENT OFFICE
CERTIFICATE OF CORRECTION

Patent No. 3,620,055      Dated November 16, 1971

Inventor(s) Donald L. Blachly and Richard A. Smith

It is certified that error appears in the above-identified patent and that said Letters Patent are hereby corrected as shown below:

Col. 1, line 61, --steam-- should be "steamer"
Col. 2, line 13, after --pump-- insert "means"
Col. 9, line 22, after --reservoir-- insert "and conduit means for selectively delivering water from said reservoir"

Signed and sealed this 18th day of July 1972.

(SEAL)
Attest:

EDWARD M. FLETCHER, JR.      ROBERT GOTTSCHALK
Attesting Officer             Commissioner of Patents